(12) United States Patent
Sano (10) Patent No.: US 8,228,625 B2
(45) Date of Patent: Jul. 24, 2012

(54) OPTICAL APPARATUS

(75) Inventor: Hidekazu Sano, Sagamihara (JP)

(73) Assignee: Mitutoyo Corporation, Kawasaki, Kanagawa (JP)

( * ) Notice: Subject to any disclaimer, the term of this patent is extended or adjusted under 35 U.S.C. 154(b) by 243 days.

(21) Appl. No.: 12/793,953

(22) Filed: Jun. 4, 2010

(65) Prior Publication Data
US 2010/0315731 A1     Dec. 16, 2010

(30) Foreign Application Priority Data
Jun. 5, 2009   (JP) ................... 2009-136132

(51) Int. Cl.
*G02B 7/02* (2006.01)
(52) U.S. Cl. ...................................... 359/827
(58) Field of Classification Search ................ 359/811, 359/819, 821, 827
See application file for complete search history.

(56) References Cited

U.S. PATENT DOCUMENTS
7,782,545 B2 *   8/2010   Lee et al. ............ 359/691

FOREIGN PATENT DOCUMENTS
JP          4-307528        10/1992
* cited by examiner

*Primary Examiner* — Joseph P Martinez
(74) *Attorney, Agent, or Firm* — Rankin, Hill & Clark LLP (57) ABSTRACT

An optical apparatus includes a lens barrel, an optical apparatus body, a body-side mounting unit, a lens-side mounting unit and a position determination mechanism. A plurality of projection pins protrude from an outer circumferential surface of a cylindrical part of the body-side mounting unit. A groove is formed in an inner circumferential surface of the lens-side mounting unit. Cutout regions that are in communication with the groove are formed in a surface of the lens-side mounting unit that faces toward a flange part of the body-side mounting unit at positions that respectively correspond to positions of the projection pins. The position determination mechanism determines a position of the lens-side mounting unit around the optical axis of the optical apparatus body.

9 Claims, 6 Drawing Sheets

OPTICAL APPARATUS

BACKGROUND OF THE INVENTION

1. Field of the Invention

The present invention relates to an optical apparatus.

2. Description of the Related Art

In the field of an optical apparatus such as a projector or a microscope, a structure for attaching a lens barrel to an optical apparatus body (hereinafter referred to as "apparatus body") by means of plate claws is known. An example of such a structure is disclosed in Japanese Unexamined Patent Application Publication No. H4-307528. In the structure of an optical apparatus disclosed in Japanese Unexamined Patent Application Publication Number H4-307528, three plate claws (outer circumferential convex parts) are formed at an apparatus-body-attachment part of a lens barrel. On the other hand, a single thread groove and cutout regions through which the plate claws can be inserted into the groove are formed in the apparatus body. A concave part is formed in the outside of each plate claw. In addition, inner circumferential convex parts are formed on the inner circumferential surface of the groove. After the raising of the lens barrel to put the plate claws into the groove of the apparatus body through the cutout regions respectively, the lens barrel is turned so that the plate claws move to deeper positions inside the groove. In this way, the lens barrel is attached to the apparatus body. When the lens barrel is turned, each of the inner circumferential convex parts that are formed on the inner circumferential surface of the groove is fitted into the concave part that is formed in the outside of the plate claw, thereby determining the position of the lens barrel around the optical axis.

However, the related-art optical apparatus that is disclosed in Japanese Unexamined Patent Application Publication No. H4-307528 has a disadvantage in that the shape of the lens barrel is inevitably complex because it is necessary to form the concave part in the plate claw for position determination, which results in increased production cost. As another disadvantage, since the cutout regions are formed at the apparatus-body side, a person who attaches the lens barrel to the apparatus body has to, for example, bend the upper part of the body for looking up the apparatus body from a lowered eye level to confirm the positions of the cutout regions. For this reason, the efficiency of lens barrel attachment is low.

SUMMARY OF THE INVENTION

The present invention is directed toward providing an optical apparatus that can reduce production cost and improve the efficiency of lens barrel attachment.

An optical apparatus according to the present invention includes: a lens barrel inside which a lens is provided, the lens barrel including a lens-side mounting unit; an optical apparatus body to which the lens barrel is attached, the optical apparatus body having an optical axis that coincides with an optical axis of the lens; a body-side mounting unit that is provided on the optical apparatus body, the body-side mounting unit having a cylindrical part and a flange part, the flange part being formed adjacent to or at one end of the cylindrical part; said lens-side mounting unit that has a cylindrical shape, the lens-side mounting unit being mounted on the outside of the cylindrical part of the body-side mounting unit, the lens-side mounting unit being turned thereon so as to be attached to the body-side mounting unit; and a position determination mechanism that determines a position of the lens-side mounting unit around the optical axis of the optical apparatus body, wherein a plurality of projection pins that protrude from an outer circumferential surface of the cylindrical part is provided on the outer circumferential surface in a circumferential direction, a groove is formed in an inner circumferential surface of the lens-side mounting unit in the circumferential direction, and cutout regions that are in communication with the groove are formed in a surface of the lens-side mounting unit that faces toward the flange part of the body-side mounting unit at positions that respectively correspond to positions of the projection pins.

To attach the lens barrel to the optical apparatus body according to the above aspect of the invention, as a first step, the lens-side mounting unit is raised for attachment to the body-side mounting unit with the cutout regions of the lens-side mounting unit being positioned respectively at the positions of the projection pins of the body-side mounting unit. As a result, the projection pins are put into the groove through the cutout regions, respectively. Next, the lens barrel is turned to move the projection pins to deeper positions inside the groove. In addition, the position determination mechanism determines the position of the lens barrel around the optical axis of the optical apparatus. In this way, the lens barrel is attached to the optical apparatus body. Since the lens barrel can be attached to the optical apparatus body by putting the projection pins into the groove, unlike related art, it is not necessary to provide plate claws having a complex shape, which makes it possible to reduce production cost. In related art, plate claws are provided at a lens-barrel side whereas a cutout part is formed at an apparatus-body side. A lens barrel is usually held under an apparatus body when the lens barrel is attached to the apparatus body. Since the cutout part is formed at the apparatus-body side, a person who attaches the lens barrel to the apparatus body has to, for example, bend the upper part of the body for looking up the apparatus body from a lowered eye level to confirm the position of the cutout part. For this reason, the efficiency of lens barrel attachment is low. According to the above aspect of the invention, the vertical positions of the projection pins and the cutout regions are reversed from those of the related art. That is, the cutout regions are formed in the lens-side mounting unit of the lens barrel whereas the projection pins are provided on the body-side mounting unit attached to the optical apparatus body. Therefore, it is easier for a person who attaches the lens barrel to the body-side mounting unit to visually recognize the cutout regions. Because of the greater visibility of the cutout regions, it is easier to put the projection pins into the groove through the cutout regions, respectively. Thus, the efficiency of lens barrel attachment improves.

In the structure of an optical apparatus according to the present invention, it is preferable that a pressing member should be provided on the flange part; the pressing member should be in contact with the surface that faces toward the flange part; and the pressing member should press the surface that faces toward the flange part in a direction away from the flange part. With such a structure, since the pressing member press the body-side surface (the surface that faces toward the flange part) of the lens-side mounting unit in a direction away from the flange part of the body-side mounting unit, the projection pins are pressed against the inner wall of the groove. Utilizing a frictional force that acts between the projection pins and the inner wall of the groove, it is possible to attach the lens barrel to the optical apparatus body securely.

In the structure of an optical apparatus according to the present invention, it is preferable that the position determination mechanism should include the projection pin and a stopper; the stopper should be provided in the groove; and the stopper should be brought into contact with the projection pin to determine the position of the lens-side mounting unit. With such a structure, when the lens barrel is turned for attachment to the optical apparatus body, the stopper is brought into collision with one projection pin to restrict rotary attachment movement. As a result, the position of the lens barrel around the optical axis can be determined. Since the position determination mechanism has a simple configuration that includes the projection pin and the stopper that is brought into collision with one projection pin to restrict rotary attachment movement, it is possible to significantly reduce production cost.

In the structure of an optical apparatus according to the present invention, it is preferable that the position determination mechanism include a position determination hole that is formed in the surface that faces toward the flange part and further includes a fitting member that is provided on the flange part; the fitting member can appear and disappear; and the fitting member can fit into the position determination hole as urged toward the surface that faces toward the flange part to determine the position of the lens-side mounting unit.

With such a structure, when the lens barrel is turned for attachment to the optical apparatus body, the fitting member that is provided on the flange part fits into the position determination hole that is formed in the body-side surface of the lens-side mounting unit. As a result, the position of the lens barrel around the optical axis can be determined. In addition, since the fitting member urges the body-side surface of the lens-side mounting unit in a direction away from the flange part of the body-side mounting unit, the projection pins are pressed against the inner wall of the groove. Utilizing a frictional force that acts between the projection pins and the inner wall of the groove, it is possible to attach the lens barrel to the optical apparatus body securely It is preferable that an optical apparatus according to the present invention should further include a reinforcing member that is provided outside the lens-side mounting unit, the reinforcing member having a cylindrical shape, the reinforcing member being mounted on the lens-side mounting unit and the body-side mounting unit to increase strength of attachment of the body-side mounting unit and the lens-side mounting unit, wherein the reinforcing member urges the lens-side mounting unit in one direction along the axial direction of the lens-side mounting unit so as to press the projection pins against the inner wall of the groove, thereby increasing the strength of attachment of the body-side mounting unit and the lens-side mounting unit.

With such a structure, the reinforcing member urges the lens-side mounting unit in one direction along the axial direction of the lens-side mounting unit so as to press the projection pins against the inner wall of the groove. Therefore, the strength of attachment of the body-side mounting unit and the lens-side mounting unit increases. Thus, it is possible to attach the lens barrel to the optical apparatus body securely.

In the structure of an optical apparatus according to the present invention, it is preferable that the lens-side mounting unit should be detachably attached as a component of the lens barrel) to a lens barrel main body. Since the lens-side mounting unit is detachably attached to the lens barrel main body, it is possible to use an existing lens barrel (lens barrel main body). In addition, since the lens-side mounting unit is detachable, when the lens-side mounting unit is broken, the broken unit can be replaced with new one, which improves the usability of the optical apparatus.

DESCRIPTION OF THE PREFERRED EMBODIMENTS

Figure 1:
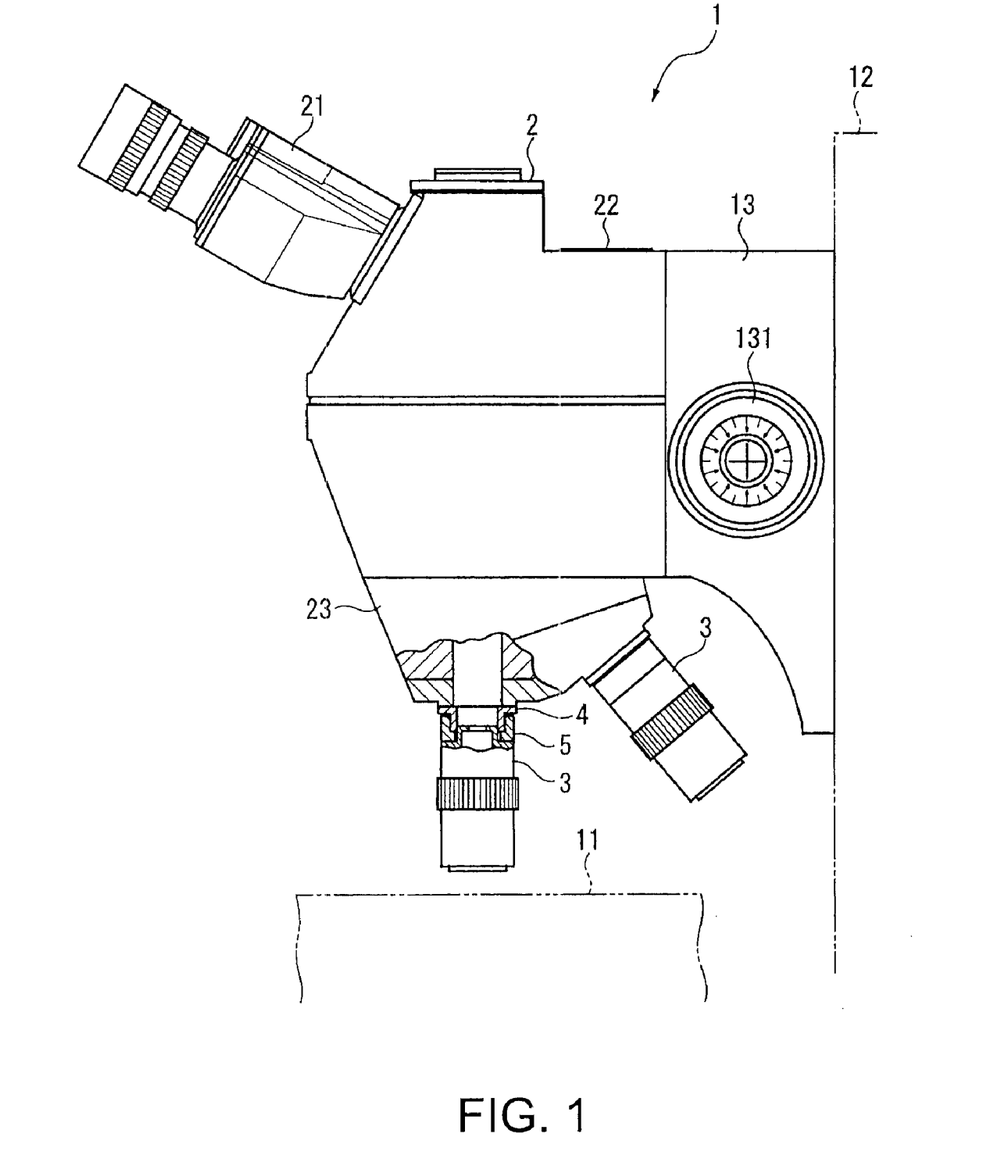
FIG. 1 is a general view that schematically illustrates the configuration of a microscope, which is an example of an optical apparatus according to a first embodiment of the invention.

With reference to the accompanying drawings, a first embodiment of the present invention will now be explained in detail. FIG. 1 is a general view that schematically illustrates the configuration of a microscope 1, which is an example of an optical apparatus according to the present embodiment of the invention. The microscope 1 includes a stage 11, a supporting column 12, an elevation device 13, a microscope body 2, and a plurality of lens barrels (i.e., bodytubes) 3. A measurement target object (not shown) is placed on the stage 11. The stage 11 can be moved in biaxial directions over a horizontal plane. The supporting column 12 extends in a direction perpendicular to the stage 11. The elevation device 13 can move up and down along the supporting column 12 when a knob 131 is turned. A plurality of optical components such as lenses, mirrors, prisms, and the like are provided inside the microscope body 2. The microscope body 2 is supported indirectly on the supporting column 12 with the elevation device 13 being provided therebetween. The plurality of lens barrels 3 is attached to the microscope body 2.

An eyepiece lens unit 21 is mounted on the upper part of the microscope body 2. The eyepiece lens unit 21 includes a pair of eyepiece lenses (not shown). A lighting window 22 is provided at the upper part of the microscope body 2. Illuminating light enters the microscope body 2 through the lighting window 22. A revolver unit 23, which can be turned, is provided at the lower part of the microscope body 2. The plurality of lens barrels 3 is attached to the revolver unit 23. An object lens (not shown) is provided inside each of the lens barrels 3. The magnifications of the object lenses are different from one another. Each of the lens barrels 3 can be selectively set at the optical axis position of the microscope body 2 through the rotary movement of the revolver unit 23. The structure of the lens barrel 3 will be explained later.

In the microscope 1 having the above configuration, a beam of illuminating light that has entered the microscope body 2 through the lighting window 22 reaches the measurement target object (not shown) that is placed on the stage 11 through the optical components provided inside the microscope body 2 and through the object lens provided inside the lens barrel 3 for illumination. After reflection at the measurement target object, the light is guided to the eyepiece lenses of the eyepiece lens unit 21 through the object lens of the lens barrel 3 and through the optical components of the microscope body 2. As a result, an observer can visually observe the measurement target object through the eyepiece lenses in a magnified view.

The microscope 1 having the above configuration further includes a body-side mounting unit 4 and a lens-side mounting unit 5. The body-side mounting unit 4 is provided on the bottom of the microscope body 2. The lens-side mounting unit 5, which has a cylindrical shape, is provided as a component of the lens barrel 3. The lens-side mounting unit 5 is mounted on the outside of a part of the body-side mounting unit 4. The lens-side mounting unit 5 is turned thereon to attach the lens barrel 3 to the microscope body 2. Next, the mounting structure of the lens barrel 3 is explained below.

Figure 2:
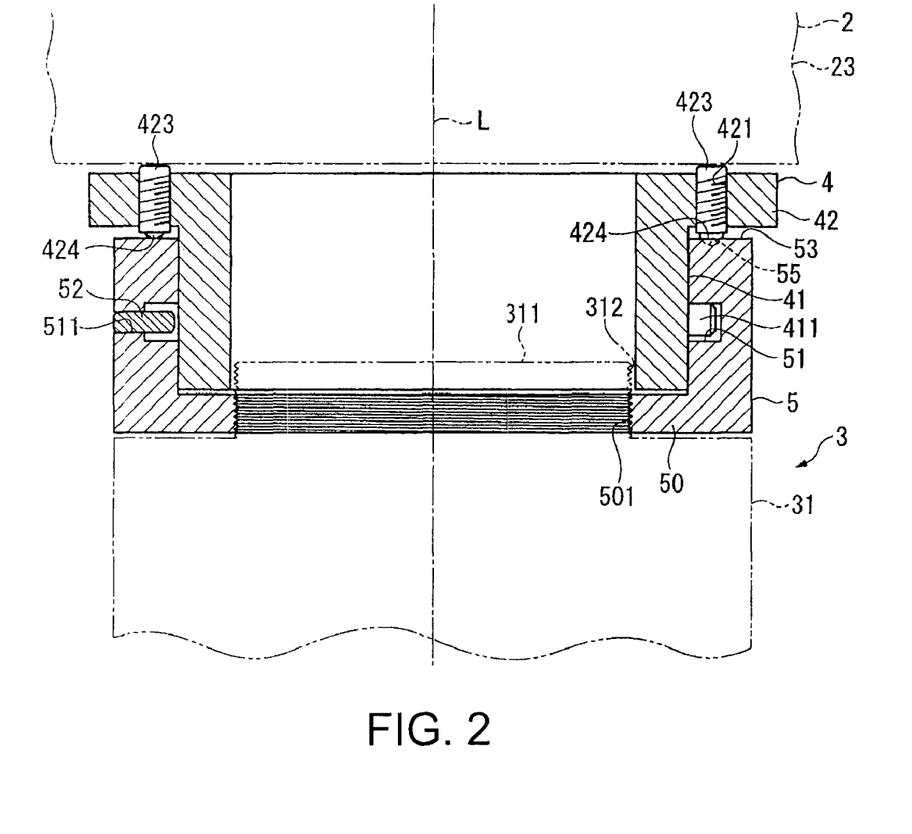
FIG. 2 is a sectional) view that schematically illustrates an example of the structure of a body-side mounting unit and a lens-side mounting unit according to the first embodiment of the invention.
Figure 3:
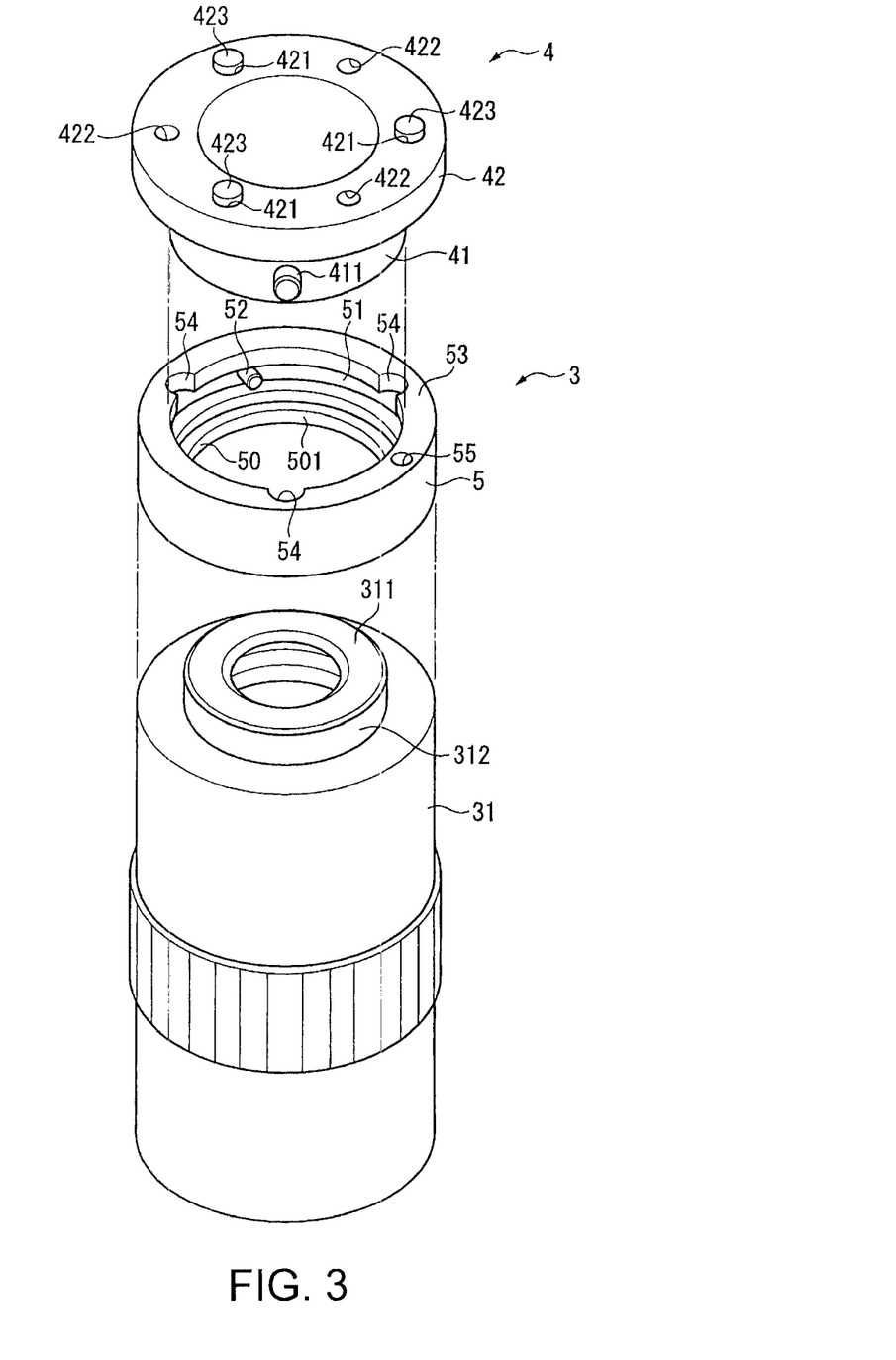
FIG. 3 is an exploded perspective view that schematically illustrates an example of the structure of the body-side mounting unit and a lens barrel according to the first embodiment of the invention.

FIG. 2 is a sectional view that schematically illustrates an example of the structure of the body-side mounting unit 4 and the lens-side mounting unit 5 according to the present embodiment of the invention. FIG. 3 is an exploded perspective view that schematically illustrates an example of the structure of the body-side mounting unit 4 and the lens barrel 3 according to the present embodiment of the invention. The body-side mounting unit 4 includes a cylindrical part 41 and a flange part 42. The flange part 42 is formed next to an end of the cylindrical part 41.

Figure 4:
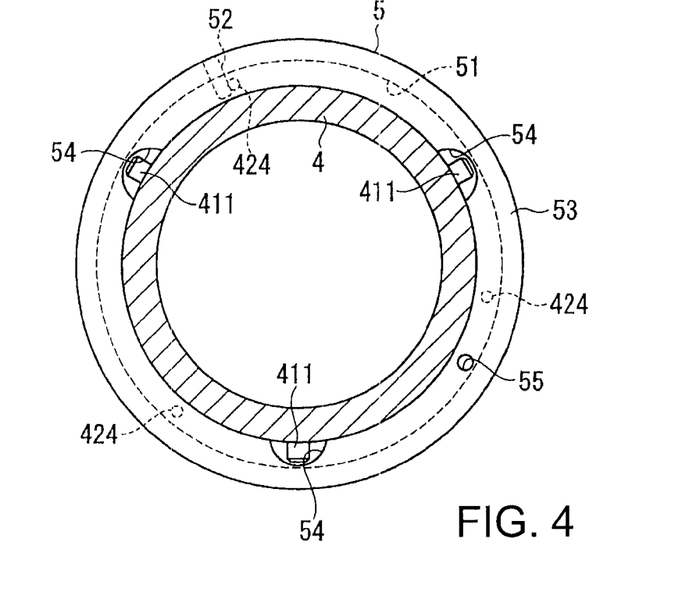
FIG. 4 is a plan view that schematically illustrates an example of a state of the mounting units after the insertion of projection pins into a groove through cutout regions according to the first embodiment of the invention.

Three projection pins 411, which protrude from the outer circumferential surface of the cylindrical part 41, are provided on the outer circumferential surface at equal spaces in the circumferential direction (refer to FIG. 4). The projection pins 411 may be fixed to the outer circumferential surface of the cylindrical part 41 by, for example, welding or bonding. Or, the projection pins 411 may be screwed in threaded screw holes that are formed through the circumferential surface of the cylindrical part 41. As another example, the projection pins 411 may be fitted tightly in holes that are formed through the circumferential surface of the cylindrical part 41.

Three threaded screw holes 421 and three fixation holes 422 (refer to FIG. 3) are formed through the flange part 42. Plunger screws 423 are threaded in the screw holes 421. A ball 424 is provided at the tip of each of the plunger screws 423. The ball 424 is a member that can move in a protruding direction toward the lens-side mounting unit 5 to show itself from the plunger screw 423 and move in a retracting direction, that is, the opposite direction, to hide the most part of itself into the plunger screw 423. The ball 424 is an example of a pressing member and a fitting member according to an aspect of the invention. A spring (not shown) is provided inside the plunger screw 423. The spring urges the ball 424 toward the lens-side mounting unit 5. A screw (not shown) is inserted through each of the fixation holes 422. These screws are threadably mounted on the lower part of the revolver unit 23. The body-side mounting unit 4 is attached to the revolver unit 23 by means of these screws.

The lens barrel 3 is made up of a lens barrel main body 31 and the cylindrical lens-side mounting unit 5. The aforementioned object lens is provided inside the lens barrel main body 31. The lens-side mounting unit 5 is detachably attached to one end of the lens barrel main body 31. A protruding part 311, which protrudes toward the microscope body 2, is formed at the one-end side of the lens barrel main body 31. An external thread 312, that is, a male-screw part, is formed on the outer circumferential surface of the protruding part 311.

The lens-side mounting unit 5 is a cylindrical member. A mounting part 50 is formed as the bottom part of the lens-side mounting unit 5. The mounting part 50 is an internal flange part having a slightly smaller diameter. An internal thread 501, that is, a female-screw part, is formed on the inner circumferential surface of the mounting part 50. The mounting part 50 is threadably mounted on the protruding part 311 for attachment of the lens-side mounting unit 5 to the lens barrel main body 31.

A single thread groove 51 into which the projection pins 411 can be put is formed as a continuous circular groove in the inner circumferential surface of the lens-side mounting unit 5. A stopper pin 52 is provided in the groove 51. The stopper pin 52 is an example of a stopper according to an aspect of the invention. The stopper pin 52 is fitted tightly in a hole 511 that is formed at the groove 51. Notwithstanding the above, however, the stopper pin 52 may be provided in the groove 51 with the use of any alternative fixation means. When the lens-side mounting unit 5 is turned in a state in which the projection pins 411 are positioned inside the groove 51, the stopper pin 52 is brought into collision (i.e., contact) with one projection pin 411 to restrict rotary attachment movement as a stopper. By this means, the position of the lens-side mounting unit 5 around the optical axis of the microscope body 2 (optical axis L) is determined, which means that the position of the lens barrel main body 31 around the optical axis of the microscope body 2 is also determined.

The lens-side mounting unit 5 has a ring-shaped surface that faces toward the body-side mounting unit 4. The ring-shaped surface is hereinafter referred to as "body-side surface" 53. Cutout regions 54 are formed in the body-side surface 53 at positions that respectively correspond to the positions of the projection pins 411. The cutout regions 54 and the groove 51 are formed as a continuous cavity such that the cutout regions 54 are in communication with the groove 51 (refer to FIG. 3). In the present embodiment of the invention, the projection pins 411 are put into the groove 51 through the cutout regions 54, respectively. Then, the lens barrel 3 is turned in a state in which the projection pins 411 are positioned inside the groove 51. In this way, it is possible to attach the lens barrel 3 to the body-side mounting unit 4. In addition, a position determination hole 55 is formed in the body-side surface 53. One ball 424 fits into the position determination hole 55 in the course of attachment, which additionally determines the position of the lens barrel 3 around the optical axis. In the present embodiment of the invention, the position determination hole 55, the ball 424, the stopper pin 52, and the projection pin 411 make up an example of a position determination mechanism according to an aspect of the invention, which determines the position of the lens barrel 3 around the optical axis.

Next, a method of attaching the lens barrel 3 to the microscope body 2 is briefly explained below. As a first step, the mounting part 50 of the lens-side mounting unit 5 is threadably mounted on the protruding part 311 of the lens barrel main body 31, thereby attaching the lens-side mounting unit 5 to the lens barrel main body 31.

Figure 5:
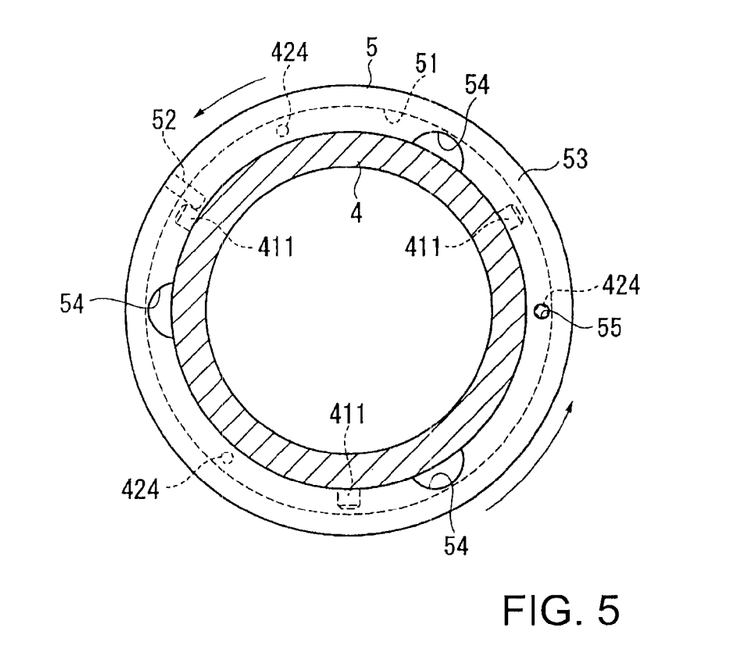
FIG. 5 is a plan view that schematically illustrates an example of a state of the mounting units after the turning of the lens-side mounting unit according to the first embodiment of the invention.

FIG. 4 is a plan view that schematically illustrates an example of a state of the mounting units 4 and 5 after the insertion of the projection pins 411 into the groove 51 through the cutout regions 54 with the lens-side mounting unit 5 having not been turned yet. FIG. 5 is a plan view that schematically illustrates an example of a state of the mounting units 4 and 5 after the turning of the lens-side mounting unit 5. After the attachment of the lens-side mounting unit 5 to the lens barrel main body 31, as illustrated in FIG. 4, the lens-side mounting unit 5 is raised for attachment to the body-side mounting unit 4 with the cutout regions 54 of the lens-side mounting unit 5 being positioned respectively at the positions of the projection pins 411 of the body-side mounting unit 4. As a result, the projection pins 411 are put into the groove 51 through the cutout regions 54, respectively. In this state, the ball 424 of each of the plunger screws 423 is in contact with the body-side surface 53 of the lens-side mounting unit 5. Therefore, the ball 424 is in a retracted state as pressed by the body-side surface 53 into the plunger screw 423.

Next, the lens-side mounting unit 5 is turned in a counter-clockwise direction as illustrated in FIG. 5, which causes the projection pins 411 to go out of sight and move to deeper positions inside the groove 51. Specifically, the lens-side mounting unit 5 is turned in the counterclockwise direction until one ball 424 of the corresponding plunger screw 423 fits into the position determination hole 55 of the lens-side mounting unit 5, and in addition, until the stopper pin 52 is brought into contact with one projection pin 411. Because of an urging force of the balls 424 as well as the weight of the lens-side mounting unit 5 itself, the lens-side mounting unit 5 is urged in a direction away from the body-side mounting unit 4 while being supported by the projection pins 411. The position determination hole 55, the ball 424, the stopper pin 52, and the projection pin 411 determine the position of the lens-side mounting unit 5 around the optical axis. The lens barrel 3 can be attached to the microscope body 2 as explained above.

The present embodiment of the invention, which is explained in detail above, produces the following advantageous effects. Since the lens barrel 3 can be attached to the microscope body 2 by putting the projection pins 411 into the groove 51, unlike related art, it is not necessary to provide plate claws having a complex shape, which makes it possible to reduce production cost. In contrast to a configuration of related art according to which plate claws are provided at a lens-barrel side whereas a cutout part is formed at a body side, in the configuration of the present embodiment of the invention, the cutout regions 54 are formed in the lens-side mounting unit 5 of the lens barrel 3 whereas the projection pins 411 are provided on the body-side mounting unit 4 attached to the microscope body 2. Therefore, it is easier for a person who attaches the lens barrel 3 to the body-side mounting unit 4 to visually recognize the cutout regions 54. Because of the greater visibility of the cutout regions 54, it is easier to put the projection pins 411 into the groove 51 through the cutout regions 54, respectively. Thus, the efficiency of lens barrel attachment improves.

Since the plunger screws 423 press the body-side surface 53 of the lens-side mounting unit 5 in a direction away from the flange part 42 of the body-side mounting unit 4, the projection pins 411 are pressed against the inner wall of the groove 51. Utilizing a frictional force that acts between the projection pins 411 and the inner wall of the groove 51, it is possible to attach the lens barrel 3 to the microscope body 2 securely. When the lens barrel 3 is turned for attachment to the microscope body 2, the stopper pin 52 is brought into collision with one projection pin 411 to restrict rotary attachment movement as a stopper. As a result, the position of the lens barrel 3 around the optical axis can be determined. Since the position determination mechanism has a simple configuration that includes the stopper pin 52 and the projection pin 411, is possible to significantly reduce production cost.

The position determination mechanism includes the ball 424 of the plunger screw 423, which is provided at the microscope-body (2) side, and the position determination hole 55, which is formed at the lens-barrel (3) side. The ball 424 fits into the position determination hole 55 when the lens barrel 3 is turned for attachment to the microscope body 2, which additionally determines the position of the lens barrel 3 around the optical axis. In addition, since an urging force of the balls 424 is applied to the body-side surface 53 of the lens-side mounting unit 5 in a direction away from the flange part 42 of the body-side mounting unit 4, the projection pins 411 are pressed against the inner wall of the groove 51. Utilizing a frictional force that acts between the projection pins 411 and the inner wall of the groove 51, it is possible to attach the lens barrel 3 to the microscope body 2 securely.

Since the lens-side mounting unit 5 is detachably attached as a component of the lens barrel 3 to the lens barrel main body 31, it is possible to use an existing lens barrel main body (lens barrel). In addition, since the lens-side mounting unit 5 is detachable, when the lens-side mounting unit 5 is broken, the broken unit can be replaced with new one, which improves the usability of the microscope (optical apparatus) 1.

Figure 6:
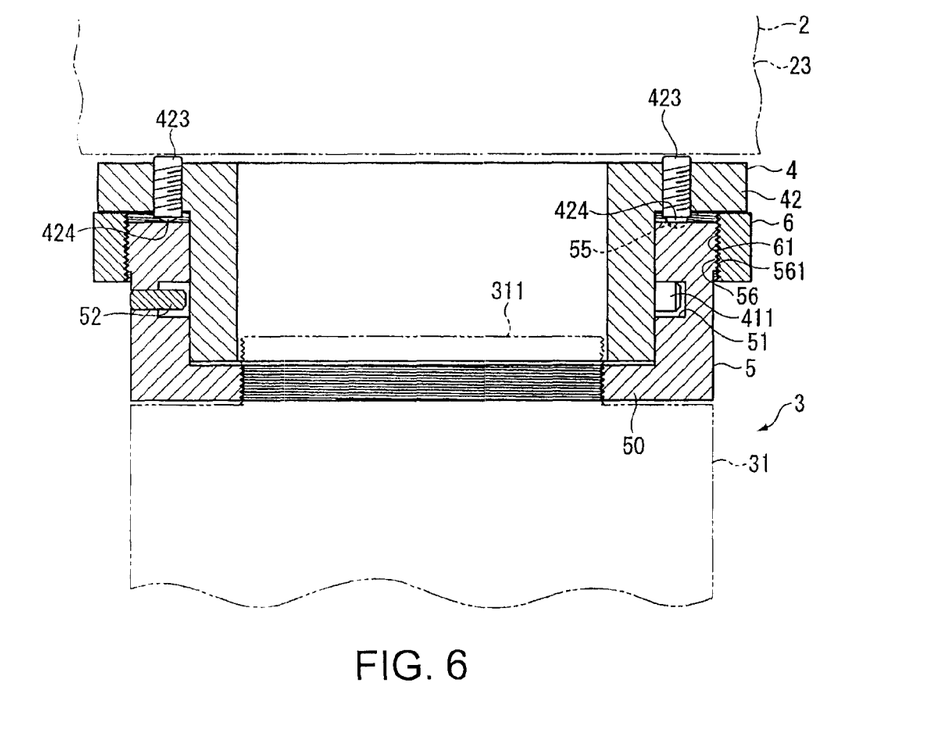
FIG. 6 is a sectional view that schematically illustrates an example of a stiffening member according to a second embodiment of the invention.

FIG. 6 is a sectional view that schematically illustrates an example of the structure of a stiffening member 6, which increases the strength of attachment of the body-side mounting unit 4 and the lens-side mounting unit 5 as a reinforcing member, as well as the structure of the mounting units 4 and 5 according to a second embodiment of the invention. In the following description, the same reference numerals are consistently used for the same components as those of the foregoing first embodiment of the invention so as to omit redundant explanation or simplify explanation. A feature of the present embodiment of the invention lies in that the stiffening member 6 that has a cylindrical shape and increases the strength of attachment of the body-side mounting unit 4 and the lens-side mounting unit 5 is provided on the outside of the lens-side mounting unit 5. The characteristic structures, functions, and other points of the lens-side mounting unit 5 according to the present embodiment and the stiffening member 6 are explained below. The lens-side mounting unit 5 has a protuberance part 56 at a region near the body-side mounting unit 4. The protuberance part 56 is slightly raised outward. An external thread 561 is formed on the surface of the protuberance part 56.

On the other hand, an internal thread 61 is formed on the inner circumferential surface of the stiffening member 6. The internal thread 61 is a female-screw part with which the external thread 561, that is, a male-screw part, mates. After the attachment of the lens barrel 3 to the body-side mounting unit 4, the stiffening member 6 having the above structure is fixed on the outside of the lens-side mounting unit 5. Since the threaded stiffening member 6 is fixed to the external thread 561 in tight and firm contact with the flange part 42 of the body-side mounting unit 4, the lens-side mounting unit 5 is urged in its axial direction away from the body-side mounting unit 4. Since the lens-side mounting unit 5 is urged away from the body-side mounting unit 4, the projection pins 411 are pressed against the body-side inner wall of the groove 51 (that is, the body-side inner wall of the groove 51 is pressed against the projection pins 411). Herein, the body-side inner wall is a part of the inner wall of the groove 51 that is relatively close to the body-side mounting unit 4. As a result, a frictional force that acts between the projection pins 411 and the inner wall of the groove 51 increases, thereby reinforcing the attachment of the mounting units 4 and 5. Therefore, the present embodiment of the invention makes it possible to attach the lens barrel 3 to the microscope body 2 with an increased strength.

Figure 7:
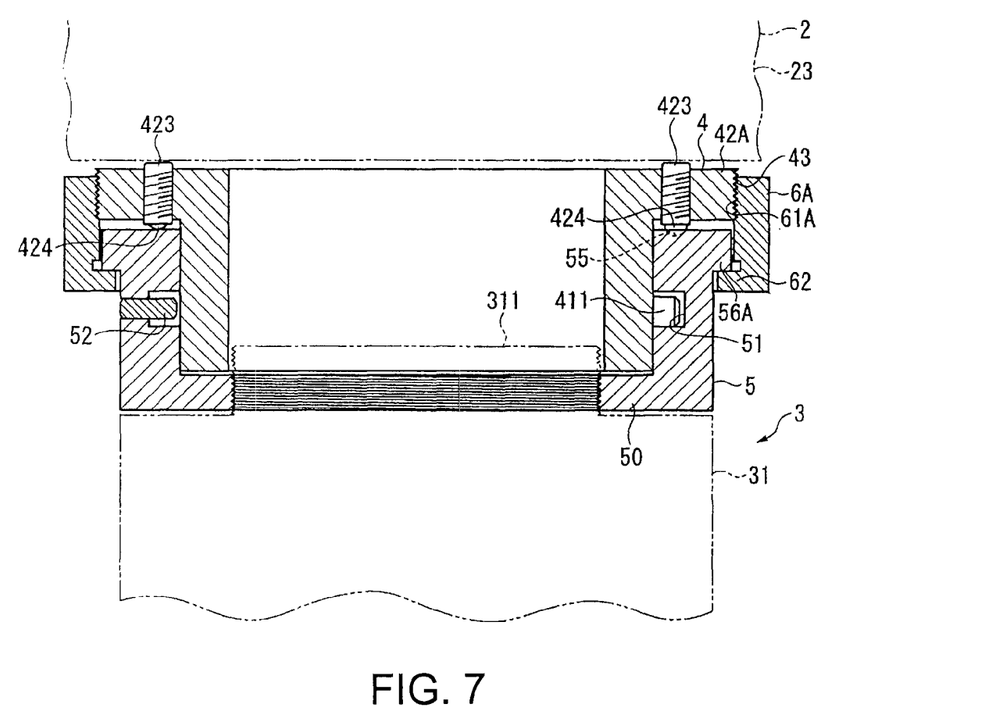
FIG. 7 is a sectional view that schematically illustrates an example of a stiffening member according to a third embodiment of the invention.

FIG. 7 is a sectional view that schematically illustrates an example of the structure of a stiffening member 6A as well as the structure of the mounting units 4 and 5 according to a third embodiment of the invention. In the second embodiment of the invention, the stiffening member 6 urges the lens-side mounting unit 5 in its axial direction away from the body-side mounting unit 4. A feature of the present embodiment of the invention lies in that the stiffening member 6A urges the lens-side mounting unit 5 in its axial direction toward the body-side mounting unit 4. The characteristic structures, functions, and other points of the mounting units 4 and 5 according to the present embodiment and the stiffening member 6A are explained below.

An external thread 43 is formed on the side surface of a flange part 42A of the body-side mounting unit 4. The lens-side mounting unit 5 has a protuberance part 56A, which is raised outward. No external thread is formed on the side surface of the protuberance part 56A according to the present embodiment of the invention.

On the other hand, an internal thread 61A is formed on the inner circumferential surface of the stiffening member 6A at a region that is in contact with the body-side mounting unit 4. The internal thread 61A is a female-screw part with which the external thread 43, that is, a male-screw part, mates. The stiffening member 6A has a flanged bottom part 62 that protrudes inward. The flanged bottom part 62 is formed at an end that is relatively remote from the body-side mounting unit 4. After the attachment of the lens barrel 3 to the body-side mounting unit 4, the stiffening member 6A having the above structure is fixed on the flange part 42A outside the lens-side mounting unit 5. The stiffening member 6A is threadably mounted on the male-screw part 43 until its bottom part 62 is brought into tight and firm contact with the protuberance part 56A. The stiffening member 6A urges the lens-side mounting unit 5 in its axial direction toward the body-side mounting unit 4. Since the lens-side mounting unit 5 is urged toward the body-side mounting unit 4, the projection pins 411 are pressed against a part of the inner wall of the groove 51 that is relatively remote from the body-side mounting unit 4. Like the second embodiment of the invention, the present embodiment of the invention makes it possible to reinforce the attachment of the mounting units 4 and 5 and thus attach the lens barrel 3 to the microscope body 2 with an increased strength.

Variation Examples of Foregoing Embodiments

The scope of the invention is not limited to any of the foregoing embodiments. Various modifications, improvements, and the like that are made within a range in which an object of the invention is achieved are encompassed therein. In each of the foregoing embodiments of the invention, three projection pins 411 are provided on the outer circumferential surface of the cylindrical part 41 of the body-side mounting unit 4 in the circumferential direction. However, the scope of the invention is not limited to such an exemplary structure. The number of the projection pins 411 provided on the outer circumferential surface in the circumferential direction may be two, four or more.

In each of the foregoing embodiments of the invention, the single thread groove 51 is formed as a continuous circular groove in the inner circumferential surface of the lens-side mounting unit 5. However, the scope of the invention is not limited to such an exemplary structure. An individual groove having a length corresponding to each of the projection pins 411 may be formed at a position corresponding to each of the projection pins 411 on the same circle. Though the stopper pin 52 is taken as an example of a stopper in each of the foregoing embodiments of the invention, the scope of the invention is not limited to such an exemplary structure. For example, when individual grooves are formed as explained above, a wall surface of the groove formed in the circumferential direction (that is, a part of the walls of the groove that is brought into collision with one projection pin 411 when the lens barrel 3 is turned) may function as a stopper. Or, any other alternative means that is brought into collision with one projection pin 411 when the lens barrel 3 is turned may be adopted as a stopper.

In each of the foregoing embodiments of the invention, the ball 424 of the plunger screw 423 is taken as an example of a pressing member. However, any other alternative means that is in contact with the body-side surface 53 and presses the body-side surface 53 in a direction away from the flange part 42, 42A may be adopted as a pressing member. In each of the foregoing embodiments of the invention, the ball 424 doubles as a pressing member and a fitting member. However, a pressing member and a fitting member may be provided as two different members.

In each of the foregoing embodiments of the invention, the ball 424 of the plunger screw 423 is taken as an example of a fitting member. However, any other alternative means that is provided on the body-side mounting unit 4 in such a manner that it can protrude or appear toward the body-side surface 53 of the lens-side mounting unit 5 and retract or disappear and can fit into the position determination hole 55 as urged toward the body-side surface 53 may be adopted as a fitting member. In each of the foregoing embodiments of the invention, a position determination mechanism includes the projection pin 411, the stopper pin 52, the ball 424, and the position determination hole 55. However, the scope of the invention is not limited to such an exemplary structure. A position determination mechanism may include either a combination of the projection pin 411 and the stopper pin 52 only or a combination of the ball 424 and the position determination hole 55 only. Or, a position determination mechanism may determine the position of the lens barrel 3 by any other alternative means without the combinations described in the foregoing embodiments.

In each of the foregoing embodiments of the invention, though it is explained that the lens-side mounting unit 5 is provided as a detachable component of the lens barrel 3, the lens-side mounting unit 5 may be formed as a part of the lens barrel 3. In each of the foregoing embodiments of the invention, a microscope is taken as an example of an optical apparatus according to an aspect of the invention. Besides a microscope, the invention can be applied to various optical apparatuses that include a lens barrel inside which a lens is provided and an optical apparatus body to which the lens barrel is attached. An example of such an optical apparatus is a projector.

The present invention can be applied to various optical apparatuses such as a projector, a microscope, and the like.

What is claimed is:

1. An optical apparatus comprising:
    a lens barrel inside which a lens is provided, the lens barrel including a lens-side mounting unit;
    an optical apparatus body to which the lens barrel is attached, the optical apparatus body having an optical axis that coincides with an optical axis of the lens;
    a body-side mounting unit that is provided on the optical apparatus body, the body-side mounting unit having a cylindrical part and a flange part, the flange part being formed adjacent to or at one end of the cylindrical part;
    said lens-side mounting unit that has a cylindrical shape, the lens-side mounting unit being mounted on the outside of the cylindrical part of the body-side mounting unit, the lens-side mounting unit being turned thereon so as to be attached to the body-side mounting unit; and
    a position determination mechanism that determines a position of the lens-side mounting unit around the optical axis of the optical apparatus body, wherein a plurality of projection pins that protrudes from an outer circumferential surface of the cylindrical part is provided on the outer circumferential surface in a circumferential direction, a groove is formed in an inner circumferential surface of the lens-side mounting unit in the circumferential direction, and cutout regions that are in communication with the groove are formed in a surface of the lens-side mounting unit that faces toward the flange part of the body-side mounting unit at positions that respectively correspond to positions of the projection pins.

2. The optical apparatus according to claim 1, wherein a pressing member is provided on the flange part; the pressing member is in contact with the surface that faces toward the flange part; and the pressing member presses the surface that faces toward the flange part in a direction away from the flange part.

3. The optical apparatus according to claim 2, wherein the position determination mechanism includes the projection pin and a stopper; the stopper is provided in the groove; and the stopper is brought into contact with the projection pin to determine the position of the lens-side mounting unit.

4. The optical apparatus according to claim 3, wherein the position determination mechanism includes a position determination hole that is formed in the surface that faces toward the flange part and further includes a fitting member that is provided on the flange part; the fitting member can appear and disappear; and the fitting member can fit into the position determination hole as urged toward the surface that faces toward the flange part to determine the position of the lens-side mounting unit.

5. The optical apparatus according to claim 2, wherein the position determination mechanism includes a position determination hole that is formed in the surface that faces toward the flange part and further includes a fitting member that is provided on the flange part; the fitting member can appear and disappear; and the fitting member can fit into the position determination hole as urged toward the surface that faces toward the flange part to determine the position of the lens-side mounting unit.

6. The optical apparatus according to claim 1, wherein the position determination mechanism includes the projection pin and a stopper; the stopper is provided in the groove; and the stopper is brought into contact with the projection pin to determine the position of the lens-side mounting unit.

7. The optical apparatus according to claim 6, wherein the position determination mechanism includes a position determination hole that is formed in the surface that faces toward the flange part and further includes a fitting member that is provided on the flange part; the fitting member can appear and disappear; and the fitting member can fit into the position determination hole as urged toward the surface that faces toward the flange part to determine the position of the lens-side mounting unit.

8. The optical apparatus according to claim 1, wherein the position determination mechanism includes a position determination hole that is formed in the surface that faces toward the flange part and further includes a fitting member that is provided on the flange part; the fitting member can appear and disappear; and the fitting member can fit into the position determination hole as urged toward the surface that faces toward the flange part to determine the position of the lens-side mounting unit.

9. The optical apparatus according to claim 1, further comprising a reinforcing member that is provided outside the lens-side mounting unit, the reinforcing member having a cylindrical shape, the reinforcing member being mounted on the lens-side mounting unit and the body-side mounting unit to increase strength of attachment of the body-side mounting unit and the lens-side mounting unit, wherein the reinforcing member urges the lens-side mounting unit in one direction along the axial direction of the lens-side mounting unit so as to press the projection pins against the inner wall of the groove, thereby increasing the strength of attachment of the body-side mounting unit and the lens-side mounting unit.

* * * * *